United States Patent
Li et al.

(10) Patent No.: US 12,379,554 B2
(45) Date of Patent: Aug. 5, 2025

(54) TAP PHOTODETECTOR AND OPTICAL FIBER COMMUNICATION SYSTEM

(71) Applicant: Huawei Technologies Co., Ltd., Shenzhen (CN)

(72) Inventors: Huiping Li, Shanghai (CN); Zhenghua Fu, Dongguan (CN); Yonghao Fei, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 18/173,451

(22) Filed: Feb. 23, 2023

(65) Prior Publication Data

US 2023/0194803 A1 Jun. 22, 2023

Related U.S. Application Data

(63) Continuation of application No. PCT/CN2021/114470, filed on Aug. 25, 2021.

(30) Foreign Application Priority Data

Aug. 26, 2020 (CN) .......................... 202010871859.5

(51) Int. Cl.
G02B 6/42 (2006.01)
(52) U.S. Cl.
CPC .................................. G02B 6/4206 (2013.01)
(58) Field of Classification Search
CPC .................................................... G02B 6/4206
USPC ............................................................ 398/38
See application file for complete search history.

(56) References Cited

U.S. PATENT DOCUMENTS

| | | | | |
|---|---|---|---|---|
| 4,626,679 A | * | 12/1986 | Kuwayama | G11B 7/1372 |
| 10,191,231 B2 | * | 1/2019 | Li | G02B 6/12004 |
| 2002/0118909 A1 | * | 8/2002 | Weis | H04Q 11/0005 359/872 |
| 2003/0109142 A1 | | 6/2003 | Cable et al. | |
| 2004/0071404 A1 | * | 4/2004 | Masalkar | G02B 6/4206 385/48 |
| 2010/0092128 A1 | * | 4/2010 | Okayama | G02B 6/4246 385/33 |
| 2011/0089314 A1 | * | 4/2011 | Yang | G02B 6/4207 250/227.2 |

(Continued)

FOREIGN PATENT DOCUMENTS

| | | | |
|---|---|---|---|
| CN | 103338068 B | | 4/2016 |
| CN | 208399010 U | * | 1/2019 |

(Continued)

OTHER PUBLICATIONS

Li et al; High Power 10-18 GHz Monolithic Limiter Based on GaAs p-i-n Technology ; Sep. 2022; IEEE Microwave and Wireless components letters, vol. 32, No. 9 (Year: 2022).*

*Primary Examiner* — Amritbir K Sandhu
(74) *Attorney, Agent, or Firm* — Conley Rose, P.C.

(57) ABSTRACT

A tap photodetector includes at least one detection unit configured to detect an optical signal. Each detection unit may separately detect an optical signal. Each detection unit includes a transparent zone and a detection zone. The transparent zone is configured to transmit a part of an optical signal, and the detection zone is disposed on a periphery of the transparent zone and is configured to detect another part of the optical signal that does not pass through the transparent zone.

20 Claims, 7 Drawing Sheets

(56) References Cited

U.S. PATENT DOCUMENTS

2014/0217297 A1\* 8/2014 Bolotnikov ............. G01T 1/247
250/370.12

FOREIGN PATENT DOCUMENTS

| GB | 2395078 A * | 5/2004 | ........... G02B 6/3588 |
| WO | WO-2019031001 A1 * | 2/2019 | ............. G01S 17/89 |
| WO | WO-2019082513 A1 * | 5/2019 | ................ G01J 1/44 |

\* cited by examiner

Optical signal

Optical signal

Optical signal

TAP PHOTODETECTOR AND OPTICAL FIBER COMMUNICATION SYSTEM

CROSS-REFERENCE TO RELATED APPLICATIONS

This is a continuation of International Patent Application No. PCT/CN2021/114470 filed on Aug. 25, 2021, which claims priority to Chinese Patent Application No. 202010871859.5 filed on Aug. 26, 2020. The disclosures of the aforementioned applications are hereby incorporated by reference in their entireties.

TECHNICAL FIELD

This application relates to the field of communication technologies, and in particular, to a tap photodetector and an optical fiber communication system.

BACKGROUND

A tap photodetector (Tap PD) is configured to monitor or feed back output optical power of a link. The tap photodetector is widely used in an optical fiber communication system, such as channel monitoring of a wavelength division multiplexing system, optical communication network monitoring, and optical path protection monitoring.

Currently, the tap photodetector is mostly an optical fiber component. An optical fiber communication system needs to be fused with an optical fiber when integrated. FIG. 1 is a schematic diagram of a structure of a tap photodetector. Each tap photodetector may generate two fiber splice points, and is correspondingly provided with two sets of heat shrink tubing 2, and a size of the heat shrink tubing 2 is close to that of a packaged photoelectric detector 1. In an optical fiber communication system, the photoelectric detector 1 and the heat shrink tubing 2 occupy a large space, which impedes implementation of miniaturization and a high-density optical fiber communication system. For example, in a 400*400 large-array optical switch system, 400 tap photodetectors need to be integrated. A total area occupied by the tap photodetectors is about 3 times that of an optical switch itself. Therefore, in the conventional technology, the tap photodetector cannot meet a requirement of the optical fiber communication system.

SUMMARY

This application provides a tap photodetector and an optical fiber communication system such as to implement miniaturization of the tap photodetector.

According to a first aspect, a tap photodetector is provided for detecting an optical signal. The tap photodetector includes at least one detection unit configured to detect an optical signal. Each detection unit may separately detect an optical signal. Each detection unit includes a transparent zone and a periphery disposed in the transparent zone. After an optical signal is transmitted to the detection unit, the transparent zone is configured to transmit a large part of the optical signal, and a detection zone is configured to absorb a small part of the optical signal, to detect the optical signal. When the tap photodetector is in use, in a transmission process of the optical signal, an energy detection function can be automatically implemented by using the tap photodetector, and a recoupling process through a lens and an optical fiber after signal detection is avoided, thereby reducing a loss of a main optical path and saving a system space.

In a specific implementable solution, on a plane on which a section of the detection unit is located, an area of the transparent zone is greater than an area of the detection zone, and a transmission direction of the optical signal is perpendicular to the plane on which the section of the detection unit is located. Therefore, a part of the optical signal is used for detection, and a large part of the signal is used for transmission.

In a specific implementable solution, a diameter of a flare that is of the optical signal and that is irradiated to the detection unit is greater than an inner diameter of the detection zone, to ensure that the optical signal can be irradiated to the detection zone.

In a specific implementable solution, the diameter of the flare that is of the optical signal and that is irradiated to the detection unit is further less than or equal to an outer diameter of the detection zone, to ensure that the optical signal is not irradiated to the outside of the detection unit.

In a specific implementable solution, the inner diameter of the detection zone is greater than 2.5 times a waist spot radius of the flare that is of the optical signal and that is irradiated to the detection unit.

In a specific implementable solution, the detection zone includes an active layer, and the detection unit has two electrodes connected to the active layer. The active layer has an in-light surface that absorbs an optical signal and a backlight surface disposed back to the in-light surface. The two electrodes are disposed on the backlight surface. With the two electrodes disposed on the backlight surface of the active layer, it is convenient to connect the tap photodetector to another component. In addition, a size of the tap photodetector can be reduced.

In a specific implementable solution, when there is a plurality of detection units, the plurality of detection units share a same cathode. Component integration is implemented by disposing a plurality of detection units. In addition, a structure of the tap photodetector is simplified by sharing a grounding electrode.

In a specific implementable solution, the plurality of detection units is arranged in an array manner. A dense layout is implemented.

In a specific implementable solution, a center spacing between any two adjacent detection units is greater than or equal to the diameter of the flare that is of the optical signal and that is irradiated to the detection unit. This reduces interference between adjacent optical signals.

In a specific implementable solution, the transparent zone is circular, and the detection zone is a ring nested in the transparent zone. That is, a detection structure is ensured, and the size of the tap photodetector can be reduced.

In a specific implementable solution, the transparent zone is a transparent medium layer. The transparent medium layer may be air or a semiconductor material, for example, a similar material system that has lattice matching with the active layer.

According to a second aspect, a tap photodetector is provided, where the tap photodetector includes at least one detection unit configured to detect an optical signal.

Each detection unit includes a transparent zone and a detection zone; the transparent zone has a grating structure for diffracting the optical signal; after the optical signal is transmitted to the detection unit, the grating structure of the transparent zone is configured to transmit a large part of the optical signal, and diffracts a small part of the optical signal; and the detection zone is configured to absorb the small part of the optical signal that is diffracted, to detect the optical signal. When the foregoing solution is used, a large splitting angle is implemented by using the transparent zone, and the splitting angle is related to the transparent zone, and is not limited by an incident angle. In a transmission process of the optical signal, an energy detection function can be automatically implemented by using the tap photodetector, and a recoupling process through a lens and an optical fiber after signal detection is avoided, thereby reducing a loss of a main optical path and saving a system space.

In a specific implementable solution, the transparent zone diffracts two symmetrical groups of diffracted optical signals; and there are two detection zones, and the two detection zones receive the two groups of diffracted optical signals in a one-to-one correspondence; or there is one detection zone, and the detection zone receives one group of diffracted optical signals. Detection accuracy is improved.

In a specific implementable solution, when there is one detection zone, the detection unit further includes an absorption layer, and the absorption layer is configured to absorb the other group of diffracted optical signals. Detection accuracy is improved.

In a specific implementable solution, the transparent zone diffracts one group of diffracted optical signals. There is one detection zone, and the detection zone is configured to receive the group of diffracted optical signals. Detection accuracy is improved.

According to a third aspect, an optical fiber communication system is provided, where the system includes an input optical fiber and the tap photodetector configured to detect an optical signal in the input optical fiber according to any one of the foregoing. When the foregoing solution is in use, in a transmission process of the optical signal, an energy detection function can be automatically implemented by using the tap photodetector, and a recoupling process through a lens and an optical fiber after signal detection is avoided, thereby reducing a loss of a main optical path and saving a system space.

In a specific implementable solution, the optical fiber communication system further includes a collimation lens. The tap photodetector is disposed between the collimation lens and the input optical fiber, or the tap photodetector is disposed on a side of the collimation lens that faces away from the input optical fiber. The tap photodetector may be disposed in different positions.

In a specific implementable solution, the tap photodetector may be attached to the collimation lens, which reduces a space volume occupied by the optical fiber communication system, and facilitates miniaturization development.

DESCRIPTION OF EMBODIMENTS

Figure 1:
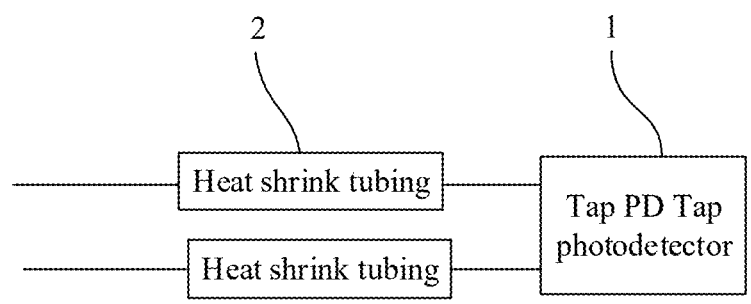
FIG. 1 is a schematic diagram of a structure of a tap photodetector in the conventional technology.

The following further describes in detail embodiments of this application with reference to the accompanying drawings.

First, a tap photodetector is described. The Tap PD is configured to monitor or feed back output optical power of a link, and the tap photodetector is used in an optical fiber communication system such as wavelength-division multiplexing (WDM)) channel monitoring, optical communication network monitoring, or optical path protection monitoring. During use, a part of energy (for example, a split ratio is 1%, 2%, 5%, or 10%) is split by using a main optical path to irradiate the tap photodetector. Optical power of the main optical path can be calculated by using the energy received by the tap photodetector and the split ratio. However, in the conventional technology, a tap photodetector is generally an optical fiber detector, occupies a large area, and cannot adapt to a miniaturization development of an optical fiber communication system. Therefore, an embodiment of this application provides a miniaturized tap photodetector such as to reduce a space occupied by the tap photodetector and simplify a connection to an optical fiber communication system. The following describes the tap photodetector provided in embodiments of this application with reference to specific accompanying drawings and embodiments.

It is first noted that same reference numerals in different accompanying drawings in embodiments of this application represent a same component. For a structure and a function of a component represented by a same reference numeral in any of the accompanying drawings, refer to descriptions of a structure and a function of a component represented by the same reference numeral in other accompanying drawings. A description of a component represented by each reference numeral applies to a component of a same reference numeral in another accompanying drawing.

Figure 2:
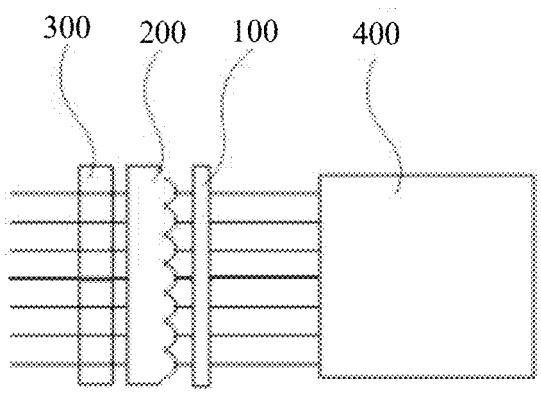
FIG. 2 is an application scenario of a tap photodetector according to an embodiment of this application.

FIG. 2 is a schematic diagram of an application scenario of a tap photodetector according to an embodiment of this application. An optical signal is input by using an optical fiber array 300. The optical signal is collimated through a lens array 200 and then enters a tap photodetector 100, and an optical signal passing through the tap photodetector 100 is irradiated into an optical receiver 400. The tap photodetector 100 includes a detection unit (not shown in the figure) corresponding to each optical signal. When passing through the detection unit, the optical signal may be detected by using the detection unit.

Figure 3:
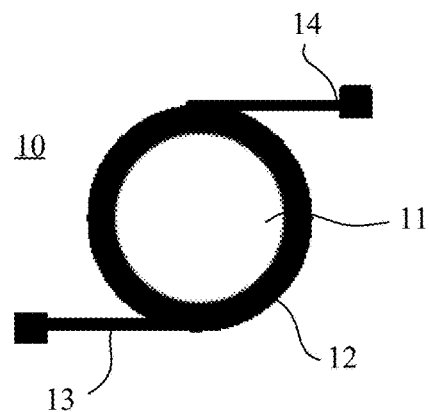
FIG. 3 is a front view of a detection unit according to an embodiment of this application.

FIG. 3 is a front view of the detection unit in the tap photodetector 100. The detection unit 10 may be divided into a transparent zone 11 and a detection zone 12 based on function division. The transparent zone 11 is configured to transmit a part of the optical signal, and the detection zone 12 is configured to absorb another part of the optical signal and detect the optical signal based on the absorbed part of the optical signal. For ease of description, the optical signal is divided into a first sub-signal and a second sub-signal. The first sub-signal is a part of the optical signal that passes through the transparent zone 11 in the optical signal, the second sub-signal is a part of the optical signal absorbed by the detection zone 12 in the optical signal, the second sub-signal may alternatively be considered as another part of the signal that does not pass through the transparent zone 11 in the optical signal, and the first sub-signal and the second sub-signal form the optical signal.

When the optical signal is irradiated to the detection unit 10, the optical signal is irradiated to the transparent zone 11 and the detection zone 12. The first sub-signal is irradiated to the transparent zone 11 and may continue to propagate along a propagation path through the transparent zone 11. The second sub-signal is irradiated to the detection zone 12 and absorbed by the detection zone 12, and the detection zone 12 may detect the optical signal based on the absorbed second sub-signal. Specifically, after the optical signal is transmitted to the detection unit 10, the transparent zone 11 is configured to transmit a large part of the optical signal (the first sub-signal), and the detection zone 12 is configured to absorb a small part of the optical signal (the second sub-signal), to detect the optical signal. The "large part" and "small part" are relative terms, that is, an amount of the optical signal passing through the transparent zone 11 is greater than an amount of the optical signal absorbed by the detection zone 12 such as to reduce loss to the optical signal.

In an optional solution, the detection zone 12 is located on a periphery of the transparent zone 11, and the periphery refers to an outer ring of encirclement, that is, the detection zone 12 is outside the transparent zone 11 and surrounds the transparent zone 11. The transparent zone 11 and the detection zone 12 may be disposed in a nested manner. The term "nested" means that when there is an assembly relationship between two objects, one object is nested into the other object. For example, the transparent zone 11 is located in a central zone of the detection unit 10, and the detection zone 12 is disposed around the transparent zone 11. When the optical signal is propagated, the first sub-signal passing through the transparent zone 11 is located at a center of the optical signal, and the second sub-signal absorbed by the detection zone 12 is located on a periphery of the optical signal, so that edge energy of the optical signal is received by the detection zone 12, and a function of detecting energy of a main optical path and feedback optimization is implemented. However, a main signal located at the center of the optical signal may continue to propagate.

It should be understood that a disposing manner shown in FIG. 3 in which the detection zone 12 is located on the periphery of the transparent zone 11 is only a specific example. The transparent zone 11 and the detection zone 12 provided in this embodiment of this application may be disposed in another manner, provided that the transparent zone 11 and the detection zone 12 are arranged in a manner in which a part of the optical signal can be transmitted, and a part of the optical signal can be absorbed. For example, the transparent zone 11 and the detection zone 12 may be disposed in a parallel manner, or in a manner in which the detection zone 12 wraps only a part of the transparent zone 11.

In an optional solution, the transparent zone 11 is circular, and the detection zone 12 is a ring nested in the transparent zone 11, so that the detection unit 10 matches a shape of a flare formed by the optical signal, thereby facilitating propagation of the optical signal. It should be understood that the transparent zone 11 and the detection zone 12 shown in FIG. 3 are only a specific example in which the transparent zone 11 and the detection zone 12 are disposed in a nested manner. The transparent zone 11 and the detection zone 12 provided in this embodiment of this application may use other different shapes. For example, the transparent zone 11 is an oval, and the detection zone 12 is an elliptical ring; or the transparent zone 11 is a rectangle, and the detection zone 12 is a rectangle ring; or the transparent zone 11 is a circle, an outer ring shape of the detection zone 12 is a rectangle, and an inner ring thereof is a circle that matches the transparent zone 11.

In an optional solution, the transparent zone 11 may be prepared by using different transparent media. For example, the transparent zone 11 may be a material that has high light transmittance, such as air, transparent resin, and transparent glass. Certainly, another common transparent material may also be used, which is not listed herein.

Still refer to FIG. 3. The detection zone 12 includes an active layer configured to absorb the second sub-signal, and the detection unit 10 has two electrodes connected to the active layer. The two electrodes are respectively an anode 13 and a cathode 14 (grounding electrode), and the anode 13 and the cathode 14 are separately connected to the active layer such as to form a photoelectric detector structure. An operating principle of the photoelectric detector is the same as a principle of the photoelectric detector in the conventional technology, and details are not described herein again.

Figure 4:
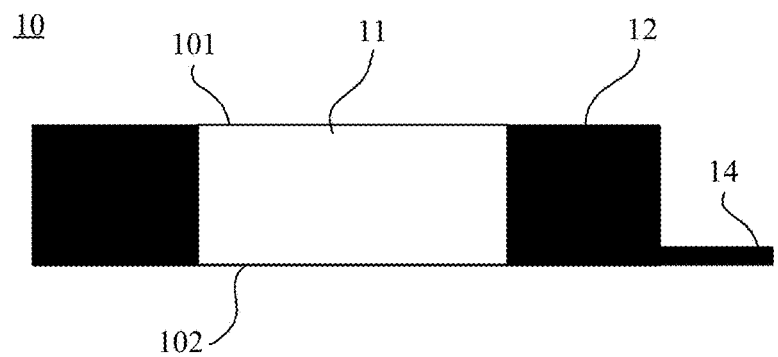
FIG. 4 is a sectional view of a detection unit according to an embodiment of this application.

FIG. 4 is a sectional view of a detection unit. For some reference numerals in FIG. 4, refer to same reference numerals in FIG. 3. The transparent zone 11 and the detection zone 12 are respectively corresponding to different structures, for example, the transparent zone 11 is corresponding to a transparent medium layer, and the detection zone 12 is corresponding to a structure of the active layer.

For example, the transparent zone 11 is circular, and the detection zone 12 is a ring. The active layer is a columnar structure with a hollow cavity, and a low-loss transparent zone 11 is disposed in the hollow cavity of the active layer. The transparent zone 11 may be a transparent medium layer or air. The transparent medium layer is usually a semiconductor material, and a similar material system that has lattice matching with the active layer, such as indium gallium arsenide/indium phosphide (InGaAS/InP), indium arsenide/gallium arsenide (InAs/GaAs), and indium gallium arsenic phosphor (InGaAsP)/InP. The transparent medium layer may be generated in an epitaxial growth manner, or in a growth manner such as metal organic chemical deposition or molecular epitaxial growth. When the transparent zone 11 is air, a cavity of the active layer is a hollow structure. After the active layer is grown, an intermediate region can be etched to become a hollow structure.

The detection unit 10 has two surfaces that are opposite to each other, which are respectively an in-light surface 101 and a backlight surface 102. With reference to the scenario shown in FIG. 2, the in-light surface 101 is a surface of the detection unit 10 facing an incident direction of the optical signal, and the optical signal is incident from the in-light surface 101 to the detection unit 10. The backlight surface 102 is a surface of the detection unit 10 facing away from the optical signal, and the optical signal may be emitted from the backlight surface 102. The optical signal may be irradiated from the in-light surface 101 to the transparent zone 11 and the detection zone 12 of the detection unit 10. In addition, the in-light surface 101 of the detection unit 10 is also an in-light surface of the transparent zone 11 and the detection zone 12, and the backlight surface 102 of the detection unit 10 is also a backlight surface of the transparent zone 11 and the detection zone 12. In addition, the in-light surface 101 and the backlight surface 102 of the detection unit 10 are also an in-light surface and a backlight surface of the tap photodetector.

In an optional solution, when a transparent medium layer is used in the transparent zone 11, an anti-reflection coating is separately attached to an in-light surface and a backlight surface of the transparent medium layer, so as to reduce reflection caused by a refractive index mismatch.

In an optional solution, two electrodes (the cathode 14 and the anode 13) are disposed on a backlight surface of the active layer, thereby reducing impact of an electrode on absorption of the optical signal by the active layer. With reference to the application scenario in FIG. 2, when the two electrodes are disposed on the backlight surface 102 of the active layer, the in-light surface of the tap photodetector (the in-light surface 101 of the detection unit 10) may directly face the incident direction of the optical signal. When the two electrodes are disposed on the backlight surface, no optical signal absorbed by the detection zone 12 is shielded. In an optional solution, the tap photodetector may be directly attached to the lens array 200, thereby reducing a space occupied by an entire optical fiber communication system.

Figure 5:
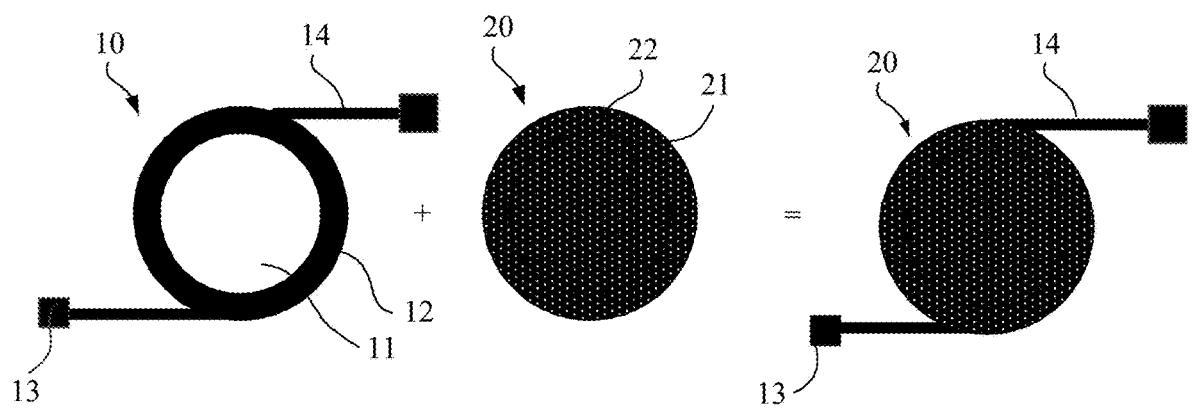
FIG. 5 is a schematic diagram of cooperation between a detection unit and an optical signal according to an embodiment of this application.
Figure 6:
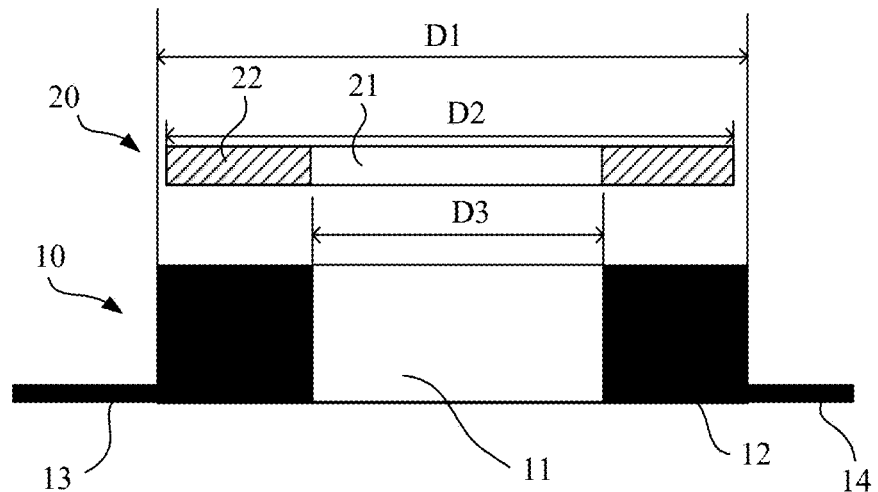
FIG. 6 is a schematic diagram of a structure of cooperation between a detection unit and an optical signal according to an embodiment of this application.

To facilitate understanding of a function of the detection unit provided in the embodiment of this application, the following describes cooperation between the optical signal and the detection unit with reference to FIG. 5 and FIG. 6. FIG. 5 is a schematic principle diagram of cooperation between an optical signal 20 and a detection unit 10, and FIG. 6 is a schematic diagram of a structure of cooperation between the optical signal 20 and the detection unit 10. To facilitate representation of the optical signal, a flare in FIG. 5 and FIG. 6 represents a flare irradiated to the detection unit 10.

First, refer to FIG. 5. For some reference numerals in FIG. 5, refer to same reference numerals in FIG. 3. In FIG. 5, an addition formula is used to represent a superposition relationship when the optical signal 20 and the detection unit 10 are applied. When the optical signal 20 is irradiated to the detection unit 10, the optical signal 20 covers an in-light surface of the detection unit 10. A first sub-signal 21 of the optical signal 20 covers the transparent zone 11, and may continue to propagate along a propagation path after passing through the transparent zone 11. A second sub-signal 22 of the optical signal 20 is irradiated to the detection zone 12, and is absorbed by the detection zone 12, to detect the optical signal 20.

As shown in FIG. 6, for some reference numerals in FIG. 6, refer to same reference numerals in FIG. 5. When the detection zone 12 and the transparent zone 11 are disposed, it is required that a part of the optical signal 20 can pass through the transparent zone 11, and a part of the optical signal 20 can be irradiated to the detection zone 12. Therefore, when the detection zone 12 and the transparent zone 11 are disposed, on a plane on which a section of the detection unit 10 is located, an area of the transparent zone 11 is greater than an area of the detection zone 12, and a transmission direction of the optical signal is perpendicular to the plane on which the section of the detection unit 10 is located. Specifically, it should be met that a diameter (D2) of a flare that is of the optical signal and that is irradiated to the detection unit 10 is greater than an inner diameter (D3) of the detection zone 12; and the diameter of the flare that is of the optical signal and that is irradiated to the detection unit 10 is further less than or equal to an outer diameter (D1) of the detection zone 12. This may be expressed as a formula: $D3<D2\leq D1$. D1 is the outer diameter of the detection zone 12 (an outer circle diameter of the detection zone 12); D2 is the diameter of the flare (>4 times a waist spot), and is also an outer diameter of the second sub-signal 22 (an outer circle diameter of the second sub-signal 22); and D3 is the inner diameter of the detection zone 12 ((an inner circle diameter of the detection zone 12)), and is also a diameter of the transparent zone 11, an inner diameter of the second sub-signal 22 ((an inner circle diameter of the second sub-signal 22)), and a diameter of the first sub-signal 21, where D1, D2, and D3 are different positive numbers. When a diameter of a flare formed by the optical signal 20 is D2, $D3<D2$ needs to be met, so as to ensure that the optical signal 20 is irradiated to the detection zone 12. In addition, the outer diameter D1 of the detection zone 12 may be set in different manners, such as D1=D2 (as shown in FIG. 5) or D1>D2 (as shown in FIG. 6). However, regardless of whether D1>D2 or D1=D2 is used, the optical signal 20 can be irradiated to the detection zone 12. In an optional solution, that the diameter D2 of the flare is slightly larger than the outer diameter D1 of the detection zone 12 may also be applied to this embodiment of this application. However, it should be noted that, to ensure integrity of optical signal transmission, the diameter of the flare can be slightly larger than the outer diameter of the detection zone 12.

In an optional solution, an axis of the detection unit 10 is the same as an axis of the flare that is of the optical signal and that is irradiated 20 to the detection unit 10, so as to ensure that a main signal at a center of the optical signal 20 can pass through the transparent zone 11, and the detection zone 12 absorbs only energy at an edge of the optical signal 20, thereby reducing impact of energy absorbed by the detection zone 12 on the optical signal 20. Certainly, when an axis of the optical signal deviates from the axis of the detection unit, this solution may also be applied to the optical fiber communication system, but a ratio of an optical signal to be absorbed needs to be obtained based on offsets of the two axes.

In an optional solution, the inner diameter of the detection zone 12 is greater than 2.5 times a waist spot radius of the flare that is of the optical signal and that is irradiated to the detection unit 10, so as to ensure that the main signal located at the center of the optical signal 20 can pass through the transparent zone 11, so as to prevent the detection zone 12 from absorbing excessive energy to affect propagation of the optical signal 20. For example, the inner diameter D3 of the detection zone 12 may be different times such as 2.5 times, 3 times, 3.5 times, or 4 times of the waist spot radius of the flare.

A ratio of absorbing the optical signal 20 can be controlled by controlling cross-sectional areas of the first sub-signal 21 and the second sub-signal 22, that is, controlling areas of the transparent zone 11 and the detection zone 12. That is, an area of a flare irradiated to the detection zone 12 can be controlled by controlling a ratio between the diameter D3 of the transparent zone 11 and the outer diameter D1 of the detection zone 12. The detection unit 10 may obtain intensity of the optical signal 20 through calculation by using the absorbed second sub-signal 22 and its ratio.

Figure 7:
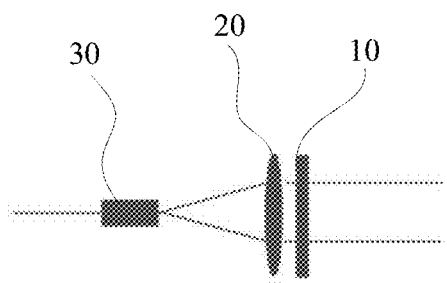
FIG. 7 is a schematic diagram of an application scenario of a tap photodetector according to an embodiment of this application.

To facilitate understanding of the effect of the detection unit provided in this embodiment of this application, the following describes the detection unit with reference to FIG. 7. FIG. 7 shows an application scenario of a detection unit. An optical path system to which the detection unit 10 is applied may include an input optical fiber 30, a collimation lens 20, the detection unit 10, and an optical receiving module (not shown in the figure). Along a propagation direction of an optical signal, the optical signal is irradiated to the collimation lens 20 by using the input optical fiber 30, is collimated by the collimation lens 20, and then is irradiated to the detection unit 10. When the optical signal is irradiated to the detection unit 10, a part of the optical signal continues to propagate through the detection unit 10, and a part of the optical signal is absorbed by the detection unit 10 to detect intensity of the optical signal. The part of the optical signal that is transmitted is irradiated to the optical receiving module to complete an entire optical path. It may be learned from the foregoing description that the detection unit 10 provided in this embodiment of this application may be directly disposed in an existing optical path, no additional optical path is generated, and no discrete tap filter is required. In a transmission process of the optical signal, an energy detection function can be automatically implemented by using the detection unit 10, and a recoupling process of the optical signal after detection in the conventional technology is avoided, thereby reducing loss to the optical signal and saving a system space.

Figure 8:
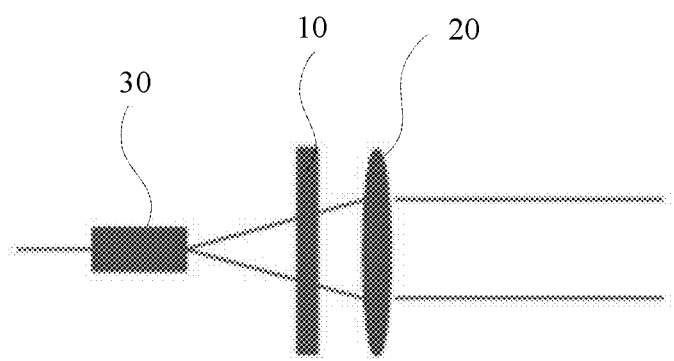
FIG. 8 is a schematic diagram of another application scenario of a tap photodetector according to an embodiment of this application.

FIG. 8 shows a deformed optical path system in FIG. 7. The detection unit 10 may be further disposed between the input optical fiber 30 and the collimation lens 20, so that the optical signal can be first detected and then collimated. It should be understood that FIG. 7 and FIG. 8 show only two specific position examples of the detection unit 10. The detection unit 10 provided in this embodiment of this application may be further disposed in another position in an optical path system. In another existing optical path system, the detection unit 10 disclosed in this application may be used, and the detection unit 10 disclosed in this application only needs to be disposed on a normal optical path, so as to complete detection of the optical signal.

Figure 9:
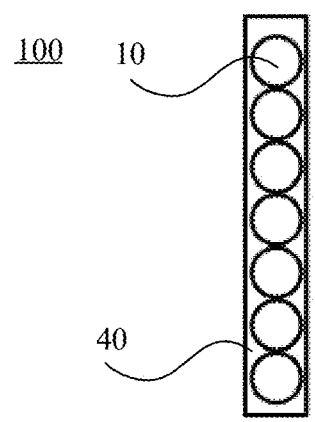
FIG. 9 is a schematic diagram of a structure of a tap photodetector according to an embodiment of this application.

FIG. 9 shows another structure of a tap photodetector according to an embodiment of this application. FIG. 9 shows a case in which the tap photodetector includes a plurality of detection units. It should be understood that there may be at least one detection unit 10 in a tap photodetector 100. A specific quantity of detection units 10 may be correspondingly set based on an actual quantity of optical signals to be detected. For example, if there is one optical signal that needs to be detected, the tap photodetector 100 includes one detection unit 10. If there are two optical signals that need to be detected, the tap photodetector 100 includes two detection units 10. If there are three or more optical signals that need to be detected, the tap photodetector 100 includes three or more detection units 10. With reference to the application scenario shown in FIG. 2, FIG. 9 shows seven detection units 10 corresponding to seven optical signals.

In an optional solution, when there is a plurality of detection units 10, the plurality of detection units 10 may use an integrated structure. The foregoing "a plurality of" means two or more. When an integrated structure is specifically implemented, an active layer may be prepared on a same substrate 40, so that a plurality of formed detection units 10 are of an integrated structure. This facilitates disposing of the detection units 10, and can avoid an assembly error occurs during assembly of the plurality of detection units 10, thereby implementing integration on components. The integrated structure used can greatly facilitate installation of the tap photodetector 100, reduce an area occupied by the tap photodetector 100, and adapt to miniaturization development of the optical path system.

In an optional solution, when there is a plurality of detection units 10 in the tap photodetector 100, the plurality of detection units 10 may be arranged in different manners, such as an array arrangement, a triangular arrangement, a circular arrangement, and a single row arrangement, so as to implement a dense layout of the plurality of detection units. A specific arrangement manner is adapted to an arrangement manner of optical signals such as to ensure that each optical signal can correspondingly pass through one detection unit 10. A specific arrangement manner is shown in FIG. 9, and seven detection units 10 of the tap photodetector 100 are arranged in a single row. In addition, there is a gap between any two adjacent detection units 10. The gap is used to avoid interference from adjacent optical signals such as to ensure that each optical signal passes through only one detection unit 10 and does not irradiate an adjacent detection unit 10.

In an optional solution, a center spacing between any two adjacent detection units 10 is not less than a diameter of a flare that is of an optical signal and that is irradiated to the detection unit. With reference to the structure shown in FIG. 6, that is, a center spacing between two detection units 10 is not less than D2 such as to ensure that a flare does not irradiate a detection unit 10 that is not corresponding to the flare, thereby reducing interference between adjacent optical signals.

In an optional solution, when there is a plurality of detection units 10, the plurality of detection units 10 share a grounding electrode. Sharing one grounding electrode means that grounding electrodes of the plurality of detection units 10 are led out of the tap photodetector 100 by using one ground cable, and grounding of the plurality of detection units 10 can be implemented by using one ground cable. When a common electrode is used, the plurality of detection units 10 need only one grounding electrode for external connection, thereby simplifying a structure of the photodetector.

Figure 10:
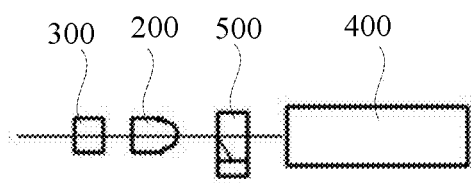
FIG. 10 is a schematic diagram of another application scenario of a tap photodetector according to an embodiment of this application.

FIG. 10 shows another application scenario of a tap photodetector according to an embodiment of this application. In an optical path system, after a light source or a main signal is transmitted by using an optical fiber array 300, the light source or the main signal becomes collimated light by using a lens array 200, and then arrives at a tap photodetector 500. The tap photodetector 500 detects an optical signal, and the optical signal passing through the tap photodetector 500 is transmitted to an optical receiver 400. A position of the tap photodetector 500 may be changed as required. For example, the tap photodetector 500 may alternatively be disposed between the lens array 200 and the optical fiber array 300.

Figure 11:
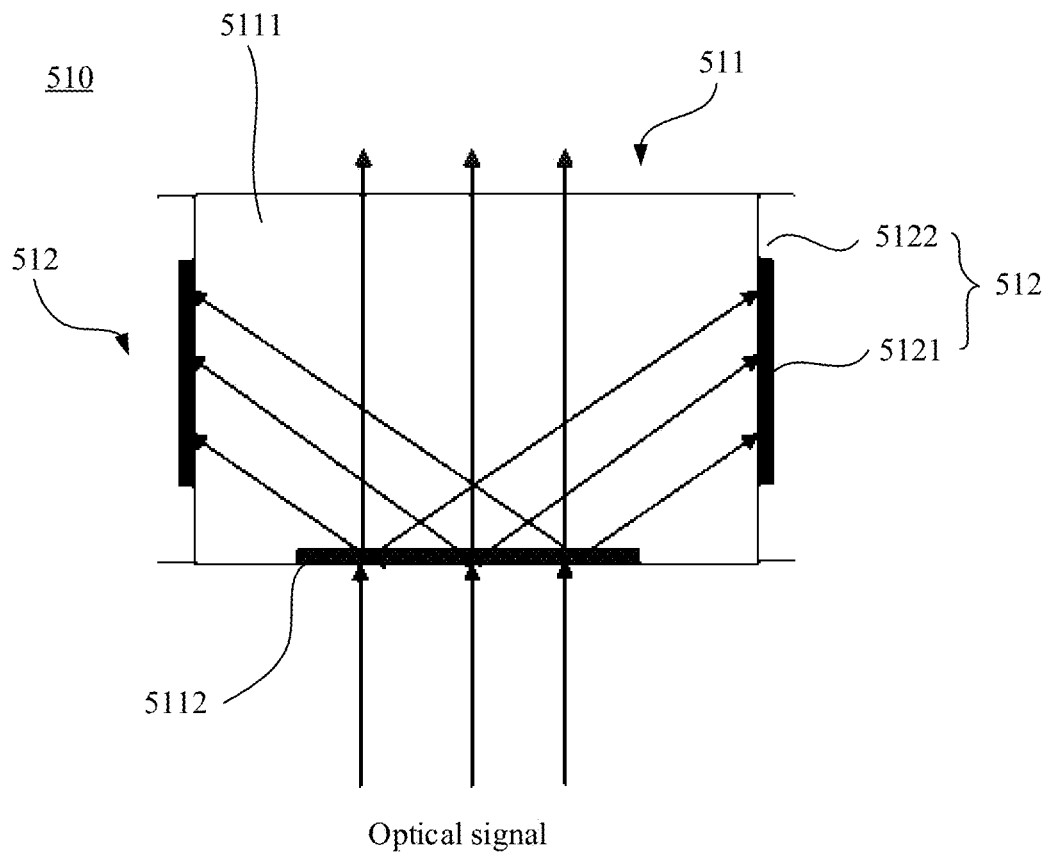
FIG. 11 is a schematic diagram of a structure of a detection unit according to an embodiment of this application.

FIG. 11 is a schematic diagram of a structure of a detection unit of a tap photodetector. A detection unit 510 is a structure that is in the tap photodetector and that is configured to implement light transmission and optical signal detection. The tap photodetector may include one detection unit 510 or at least two detection units 510, but each detection unit 510 includes a transparent zone 511 and a detection zone 512. The transparent zone 511 is configured to transmit a part of an optical signal and diffract the optical signal, and the detection zone 512 is configured to absorb the diffracted optical signal and detect the optical signal based on the absorbed diffracted optical signal.

The transparent zone 511 has a grating structure for diffracting the optical signal. When the optical signal is irradiated to the transparent zone 511, the optical signal may be diffracted by using the grating structure 5112, the diffracted optical signal is irradiated to the detection zone 512, and the detection zone 512 has a photoelectric detector for detecting the optical signal.

In an optional solution, the grating structure 5112 may diffract two symmetrical groups of diffracted optical signals, and diffraction directions of the two groups of diffracted optical signals are symmetrical, are arranged at peripheral walls in a propagation direction of the optical signal, and are respectively at an angle α with the optical signal. Correspondingly, there are two detection zones 512, the two detection zones 512 are arranged on two sides of the grating structure 5112, and the two detection zones 512 receive the two groups of diffracted optical signals in a one-to-one correspondence. In an optional solution, the two detection zones 512 are also disposed in a symmetrical manner. When the foregoing structure is used, there are two detection zones 512, so that detection by dual photoelectric detectors can be implemented, and accuracy is higher.

In an optional solution, the detection zone includes a substrate 5122 and an active layer 5121 formed on the substrate 5122. The diffracted optical signal may be irradiated to the active layer 5121 and is absorbed by the active layer 5121. The active layer 5121 absorbs the diffracted optical signal and detects the optical signal based on the absorbed diffracted optical signal.

In an optional solution, a grating structure uses a diffraction optical element grating, and the grating structure includes a base 5111 and a grating 5112 etched onto the base 5111. The grating 5112 may enable more than 95% of an incident optical signal to be transmitted through the base 5111, which then continues to propagate forward as a main optical signal. A part of the optical signal is diffracted to be transmitted at an angle with the incident optical signal. The diffracted optical signal finally reaches a side of the base 5111 and is detected by the detection zone 512 to detect intensity of the incident optical signal.

In an optional solution, the base 5111 may be prepared from a common transparent material such as glass, resin, and transparent plastic.

Figure 12:
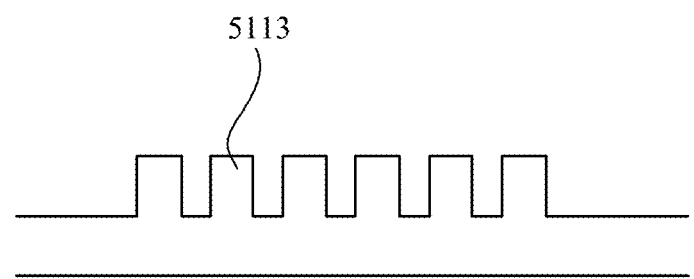
FIG. 12 is a schematic diagram of a grating structure according to an embodiment of this application.

A grating of a diffraction grating is a single-period symmetrical structure. A binary grating is used as an example. For a typical binary grating structure shown in FIG. 12, the grating is formed by using a rectangular protrusion 5113. For a binary grating structure with an edge having an angle shown in FIG. 13, the grating is formed by using an isosceles trapezoidal protrusion 5114. When incident light is incident vertically on the grating, +1 order diffracted light is transmitted symmetrically. Through calculation, when a base of a used binary grating structure is silicon nitride (SiN), a surface is silicon dioxide ($SiO_2$). When a period is 1.2 micrometers (μm), a grating height is 200 nanometers (nm), and a duty ratio is 0.5, T0 (light transmittance of 0 order diffraction) and T±1 (light transmittance of ±1 order diffraction) are respectively 96% and 1%. That is, in this structure, 96% of light is transmitted and continues to propagate along a main optical path. 1% or 2% of light is detection light.

Figure 13:
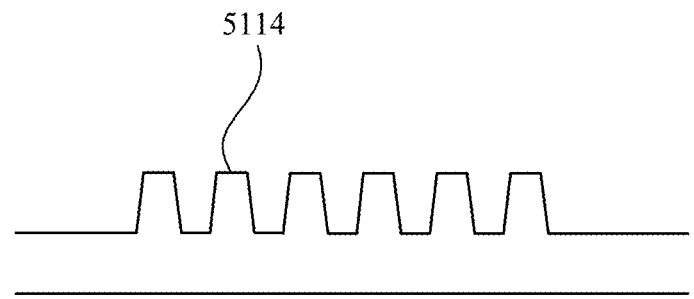
FIG. 13 is a schematic diagram of another grating structure according to an embodiment of this application.
Figure 14:
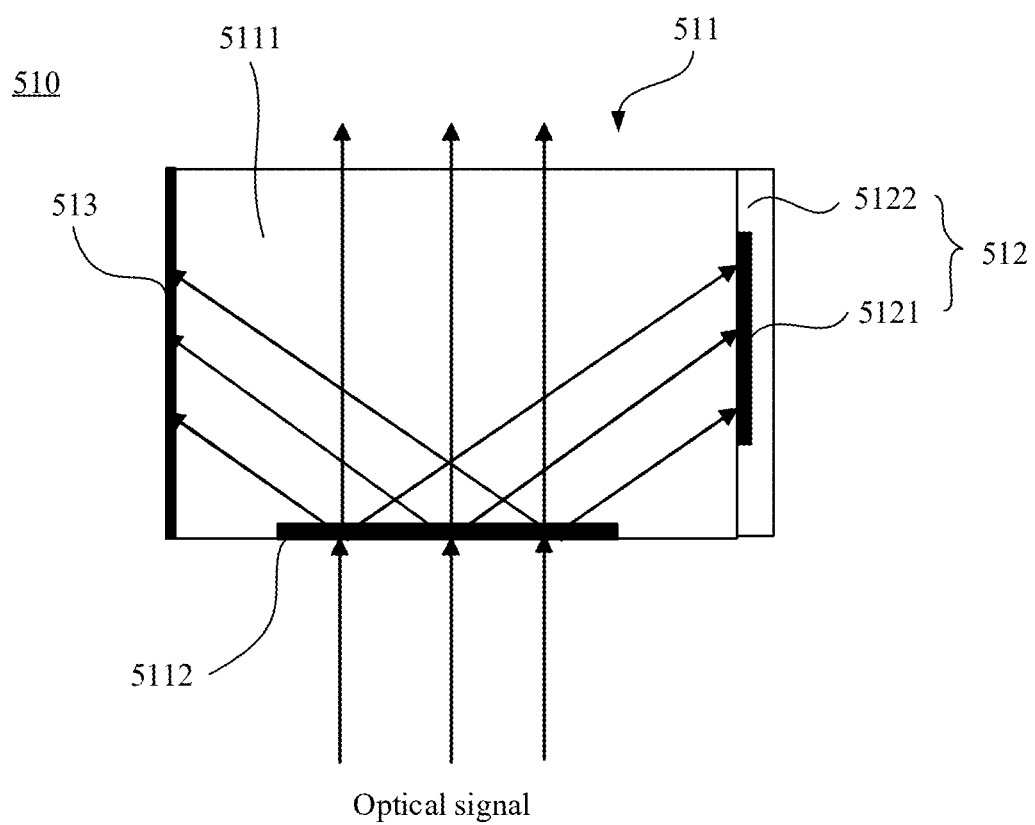
FIG. 14 is a schematic diagram of a structure of another detection unit according to an embodiment of this application.

FIG. 14 shows a variant of the detection unit shown in FIG. 13. For some reference numerals in FIG. 14, refer to same reference numerals in FIG. 13. A grating structure of the transparent zone 511 shown in FIG. 14 still uses a diffractive optical element (DOE) grating, but there is one detection zone 512, and the detection zone 512 receives one group of diffracted optical signals.

To prevent the other group of diffracted optical signals from being emitted from the detection unit 510, the detection unit 510 further includes an absorption layer 513. In this case, the detection unit 510 uses a left-right asymmetrical structure, one side of the grating structure is the detection zone 512, and the other side thereof is the absorption layer 513. One of the two groups of diffracted optical signals diffracted by the grating is absorbed by the detection zone 512, and the other side is absorbed by the absorption layer 513, thereby avoiding interference caused by diffracted light on an end face.

In an optional solution, the absorption layer 513 may be formed by using a Cr, Cr+ medium, or another material. The material is an existing material. Therefore, details are not described in this application.

Figure 15:
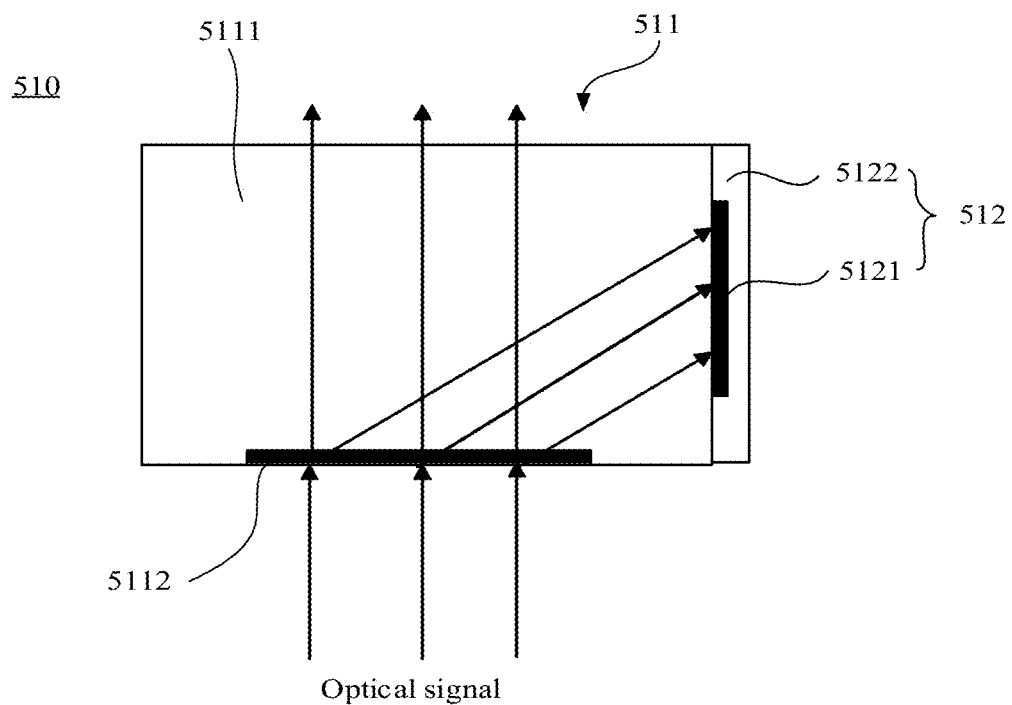
FIG. 15 is a schematic diagram of a structure of another detection unit according to an embodiment of this application.

FIG. 15 is a schematic diagram of a structure of another detection unit 510 according to an embodiment of this application. The detection unit 510 includes a transparent zone 511 and a detection zone 512. A grating structure of the transparent zone 511 diffracts one group of diffracted optical signals. There is one detection zone 512, and the detection zone 512 is configured to receive the group of diffracted optical signals. Detection accuracy is improved.

Figure 16:
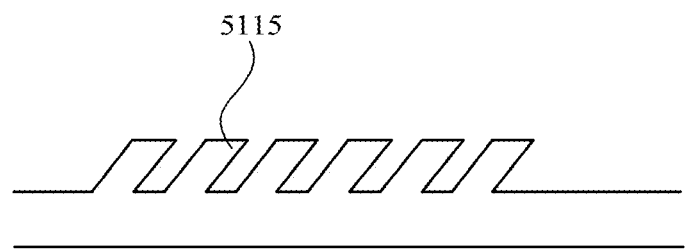
FIG. 16 is a schematic diagram of a grating structure according to an embodiment of this application.
Figure 17:
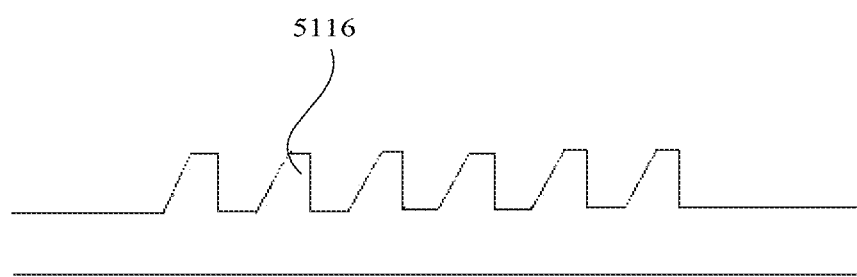
FIG. 17 is a schematic diagram of another grating structure according to an embodiment of this application.

In an optional solution, the grating structure uses an asymmetrical grating, such as an inclined grating, a blazed grating, or a holographic grating. For a grating shown in FIG. 16, the grating is formed by using an inclined rectangular protrusion 5115, or the grating is formed by using an inclined trapezoid protrusion 5117 shown in FIG. 17. When an optical signal is transmitted to the grating to emit and diffract, because the grating is asymmetrical, diffraction efficiency of T+1 (light transmittance of +1 order diffraction) and T−1 (light transmittance of −1 order diffraction) is different. Through design, diffracted light can be transmitted in a single direction to reach the detection zone 512, thereby implementing detection of light intensity.

It may be learned from the foregoing description that, when the grating of the detection unit is used to diffract the optical signal, the optical signal can be vertically disposed in the transparent zone. With reference to the application scenario shown in FIG. 10, when the tap photodetector formed by the detection unit provided in this embodiment of this application is used, a large splitting angle is implemented by using the grating structure of the transparent zone, and the splitting angle is related to the grating structure, and is not limited by an incident angle. Compared with an existing reflection-type light splitting technology, a challenge of a strong correlation between an emergent angle and an incident angle, and a larger space required for separate incidence and sounding signals is resolved. In addition, in a transmission process of the optical signal, an energy detection function is automatically implemented, and a recoupling process through a lens and an optical fiber after signal detection is avoided, thereby reducing a loss of a main optical path and saving a system space.

In an optional solution, a quantity of detection units in the tap photodetector may be correspondingly set based on an actual quantity of optical signals to be detected. For example, if there is one optical signal that needs to be detected, the tap photodetector includes one detection unit. If there are two optical signals that need to be detected, the tap photodetector includes two detection units. If there are three or more optical signals that need to be detected, the tap photodetector includes three or more detection units.

In an optional solution, when there is a plurality of detection units in the tap photodetector, the plurality of detection units may be arranged in different manners, such as an array arrangement, a triangular arrangement, a circular arrangement, and a single row arrangement such as to implement a dense layout of the plurality of detection units. A specific arrangement manner is adapted to an arrangement manner of optical signals such as to ensure that each optical signal can correspondingly pass through one detection unit.

An embodiment of this application further provides an optical fiber communication system, where the system includes an input optical fiber and the tap photodetectors configured to detect an optical signal in the input optical fiber according to any one of the foregoing. For a specific structure, refer to the optical path system shown in FIG. 2 or FIG. 10.

In an optional solution, the optical fiber communication system further includes a collimation lens. The photodetector is disposed between the collimation lens and the input optical fiber, or the photodetector is disposed on a side of the collimation lens that faces away from the input optical fiber. When the photodetector is disposed in different positions, an effect of optical signal detection can be implemented.

In an optional solution, the tap photodetector may be attached to the collimation lens. Refer to the tap photodetector shown in FIG. 3, FIG. 11, FIG. 14, or FIG. 15. Because the in-light surface of the detection unit has no another shielding structure and the detection unit is not affected by a light angle, the tap photodetector can be directly attached to the collimation lens or another component located in front thereof, thereby reducing a space volume occupied by the optical fiber communication system and facilitating miniaturization development.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A tap photodetector, comprising:
   a detector configured to detect an optical signal and comprising:
      a transparent zone configured to transmit a first part of the optical signal; and
      a detection zone disposed on a periphery of the transparent zone and configured to absorb a second part of the optical signal to detect the optical signal,
      wherein the first part of the optical signal is larger than the second part of the optical signal, and
      wherein an inner diameter of the detection zone is greater than 2.5 times a waist spot radius of a flare that is of the optical signal and that is irradiated to the detector.

2. The tap photodetector of claim 1, wherein on a plane on which a section of the detector is located, a first area of the transparent zone is greater than a second area of the detection zone, and wherein a transmission direction of the optical signal is perpendicular to the plane.

3. The tap photodetector of claim 1, wherein a diameter of the flare is greater than the inner diameter of the detection zone.

4. The tap photodetector of claim 3, wherein the diameter of the flare is further less than or equal to an outer diameter of the detection zone.

5. The tap photodetector of claim 1, wherein the detection zone comprises:
   an active layer comprising an in-light surface that absorbs the optical signal and a backlight surface that is disposed back to the in-light surface; and
   two electrodes connected to the active layer and disposed on the backlight surface, wherein the two electrodes comprise a cathode and an anode.

6. The tap photodetector of claim 5, further comprising a plurality of detectors sharing a same cathode.

7. The tap photodetector of claim 6, wherein the detectors are arranged in an array manner.

8. The tap photodetector of claim 6, wherein a center spacing between every two adjacent detectors is greater than or equal to a diameter of the flare.

9. The tap photodetector of claim 1, wherein the transparent zone comprises a transparent medium layer or air.

10. A tap photodetector, comprising:
    a detector configured to detect an optical signal and comprising:
       a transparent zone comprising a grating structure configured to transmit a first part of the optical signal and diffract a second part of the optical signal; and
       a detection zone configured to absorb the second part to detect the optical signal,
       wherein the first part of the optical signal is larger than the second part of the optical signal, and
       wherein an inner diameter of the detection zone is greater than 2.5 times a waist spot radius of a flare that is of the optical signal and that is irradiated to the detector.

11. The tap photodetector of claim 10, wherein the transparent zone diffracts two symmetrical groups of diffracted optical signals, and wherein two detection zones receive the two symmetrical groups of diffracted optical signals in a one-to-one correspondence.

12. The tap photodetector of claim 11, wherein the detector further comprises an absorption layer configured to absorb a group of diffracted optical signals.

13. The tap photodetector of claim 10, wherein the transparent zone diffracts one group of diffracted optical signals, and wherein the detection zone is configured to receive the group of diffracted optical signals.

14. The tap photodetector of claim 10, wherein the transparent zone diffracts two symmetrical groups of diffracted optical signals, and wherein the detection zone receives a first group of the diffracted optical signals.

15. The tap photodetector of claim 10, wherein the transparent zone is circular, and wherein the detection zone is a ring nested outside the transparent zone.

16. An optical fiber communication system, comprising:
    an input optical fiber; and
    a tap photodetector configured to detect an optical signal in the input optical fiber, wherein the tap photodetector comprises a detector configured to detect the optical signal, and wherein the detector comprises:
       a transparent zone configured to transmit a first part of the optical signal; and
       a detection zone disposed on a periphery of the transparent zone and configured to absorb a second part of the optical signal to detect the optical signal,
       wherein the first part of the optical signal is larger than the second part of the optical signal, and wherein an inner diameter of the detection zone is greater than 2.5 times a waist spot radius of a flare that is of the optical signal and that is irradiated to the detector.

17. The optical fiber communication system of claim 16, further comprising a collimation lens, wherein the tap photodetector is disposed between the collimation lens and the input optical fiber.

18. The optical fiber communication system of claim 16, further comprising a collimation lens, wherein the tap photodetector is disposed on a side of the collimation lens that faces away from the input optical fiber.

19. The optical fiber communication system of claim 16, wherein the transparent zone comprises a transparent medium layer or air.

20. The optical fiber communication system of claim 16, wherein a diameter of a flare that is of the optical signal and that is irradiated to the detector is greater than an inner diameter of the detection zone.

\* \* \* \* \*